United States Patent
Li et al.

(10) Patent No.: US 11,716,685 B2
(45) Date of Patent: Aug. 1, 2023

(54) WIRELESS SENSOR POWER MANAGEMENT

(71) Applicant: Carrier Corporation, Palm Beach Gardens, FL (US)

(72) Inventors: Jing Li, Avon, IN (US); Mathew Gervais, Fort Wayne, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 214 days.

(21) Appl. No.: 16/648,505

(22) PCT Filed: Sep. 24, 2018

(86) PCT No.: PCT/US2018/052407
§ 371 (c)(1),
(2) Date: Mar. 18, 2020

(87) PCT Pub. No.: WO2019/060819
PCT Pub. Date: Mar. 28, 2019

(65) Prior Publication Data
US 2021/0377853 A1 Dec. 2, 2021

Related U.S. Application Data (60) Provisional application No. 62/562,535, filed on Sep. 25, 2017.

(51) Int. Cl.
*H04W 52/02* (2009.01)
*H04W 4/38* (2018.01)
(Continued)

(52) U.S. Cl.
CPC ....... *H04W 52/0216* (2013.01); *H04L 67/125* (2013.01); *H04W 4/38* (2018.02); *H04W 52/0219* (2013.01); *H04W 84/18* (2013.01)

(58) Field of Classification Search
CPC ................................. H04W 52/0216
See application file for complete search history.

(56) References Cited

U.S. PATENT DOCUMENTS

| 5,640,153 A | * | 6/1997 | Hildebrand .............. F24F 11/62 340/7.1 |
| 9,395,708 B2 | | 7/2016 | Perez et al. |

(Continued)

FOREIGN PATENT DOCUMENTS

| CN | 101598528 A | 12/2009 |
| CN | 201463831 U | 5/2010 |

(Continued)

OTHER PUBLICATIONS

Al-Qurabat et al., "Adaptive Data Collection protocol for Extending Lifetime of Periodic Sensor Networks", The 1stInternational Conference on Information Technology, 2017, 11 pages.

(Continued)

*Primary Examiner* — Hsinchun Liao
(74) *Attorney, Agent, or Firm* — Cantor Colburn LLP (57) ABSTRACT

A method for controlling an environment control system having a controller and a wireless sensor includes determining, at the controller, that a condition exists to initiate updating a parameter of the wireless sensor; determining, at the controller, an updated parameter in response to the condition; transmitting the updated parameter from the controller to the wireless sensor; storing, at the wireless sensor, the updated parameter.

19 Claims, 4 Drawing Sheets

(51) Int. Cl.
*H04L 67/125* (2022.01)
*H04W 84/18* (2009.01)

(56) References Cited

U.S. PATENT DOCUMENTS

| | | | |
|---|---|---|---|
| 2007/0026107 A1* | 2/2007 | Wang | C12Q 1/04 426/55 |
| 2008/0277486 A1* | 11/2008 | Seem | F24F 11/30 236/49.3 |
| 2014/0183386 A1 | 7/2014 | Ravid et al. | |
| 2016/0282820 A1 | 9/2016 | Perez et al. | |
| 2016/0334823 A1 | 11/2016 | Rangineni | |
| 2017/0016869 A1 | 1/2017 | Johnson | |

FOREIGN PATENT DOCUMENTS

| | | |
|---|---|---|
| CN | 105828287 A | 8/2016 |
| CN | 106530599 A | 3/2017 |
| CN | 206223315 U | 6/2017 |
| JP | 2013239013 A | 11/2013 |
| KR | 101189864 B1 | 10/2012 |
| RU | 2539867 C1 | 1/2015 |

OTHER PUBLICATIONS

Dias, Gabriel Martins et al., "Adapting Sampling Interval of Sensor Networks Using On-Line Reinforcement Learning", Abstract, IEEE World Forum on Internet of Things 2016 Networking and Internet Architecture, 1 page.
International Search Report and Written Opinion for application PCT/US2018/052407, dated Dec. 6, 2018, 21 pages.
Srbinovski, Bruno et al., "An Energy Aware Adaptive Sampling Algorithm for Energy Harvesting WSN with Energy Hungry Sensors", abstract. Optimisation & Decision Analytics, National University of Ireland, Cork, 2016, 3 pages.
Xia, Feng, "Flexible Time-Triggered Sampling in Smart Sensor-Based Wireless Control Systems", abstract, Sensors, vol. 7, No. 11, pp. 2548-2564, 2007, 1 page.

* cited by examiner

WIRELESS SENSOR POWER MANAGEMENT

BACKGROUND

The present disclosure relates to the management of wireless sensors, and more particularly, to the management of wireless sensor parameters to improve wireless sensor battery life.

Many systems use wireless sensors to sample values. For example, in a heating, ventilation and air conditioning (HVAC) system, wireless sensors may be used to sample environmental values such as temperature or humidity. Wireless sensors often employ a low power mode or sleep state to conserve battery life. Parameters of the wireless sensor can affect battery life. For example, a sampling interval stored in the wireless sensor controls when the wireless sensor exits low power mode, makes a measurement and communicates with a controller. Often, the sampling interval is too short, resulting in reduced battery life.

BRIEF DESCRIPTION

In one embodiment, a method for controlling an environment control system having a controller and a wireless sensor includes determining, at the controller, that a condition exists to initiate updating a parameter of the wireless sensor; determining, at the controller, an updated parameter in response to the condition; transmitting the updated parameter from the controller to the wireless sensor; storing, at the wireless sensor, the updated parameter.

In addition to one or more of the features described herein, or as an alternative, further embodiments may include wherein (i) the condition has occurred or (ii) is expected to occur before a next time for bi-directional communication between the controller and the wireless sensor.

In addition to one or more of the features described herein, or as an alternative, further embodiments may include wherein the condition comprises a change in operating mode of the environmental control system.

In addition to one or more of the features described herein, or as an alternative, further embodiments may include wherein the condition comprises a change in one or more setpoints of the environmental control system.

In addition to one or more of the features described herein, or as an alternative, further embodiments may include wherein the condition comprises a change an environmental value.

In addition to one or more of the features described herein, or as an alternative, further embodiments may include wherein the change in the environmental value comprises the environmental value exceeding a threshold.

In addition to one or more of the features described herein, or as an alternative, further embodiments may include wherein the change in the environmental value comprises a rate of change of the environmental value exceeding a threshold.

In addition to one or more of the features described herein, or as an alternative, further embodiments may include wherein the condition is determined from historical data.

In addition to one or more of the features described herein, or as an alternative, further embodiments may include wherein the wireless sensor comprises a plurality of wireless sensors, the plurality of wireless sensors arranged so that each wireless sensor is associated with a respective zone of the environmental control system.

In addition to one or more of the features described herein, or as an alternative, further embodiments may include wherein the parameter comprises at least one of sampling interval, bi-directional communication interval, delta temperature threshold and delta humidity threshold.

In another embodiment, an environment control system includes a controller; a wireless sensor in communication with the controller; the controller determining that a condition exists to initiate updating a parameter of the wireless sensor; the controller determining an updated parameter in response to the condition; the controller transmitting the updated parameter to the wireless sensor; the wireless sensor storing the updated parameter.

In addition to one or more of the features described herein, or as an alternative, further embodiments may include wherein (i) the condition has occurred or (ii) is expected to occur before a next time for bi-directional communication between the controller and the wireless sensor.

In addition to one or more of the features described herein, or as an alternative, further embodiments may include wherein the condition comprises a change in operating mode of the environmental control system.

In addition to one or more of the features described herein, or as an alternative, further embodiments may include wherein the condition comprises a change in one or more setpoints of the environmental control system.

In addition to one or more of the features described herein, or as an alternative, further embodiments may include wherein the condition comprises a change an environmental value.

In addition to one or more of the features described herein, or as an alternative, further embodiments may include wherein the change in the environmental value comprises the environmental value exceeding a threshold.

In addition to one or more of the features described herein, or as an alternative, further embodiments may include wherein the change in the environmental value comprises a rate of change of the environmental value exceeding a threshold.

In addition to one or more of the features described herein, or as an alternative, further embodiments may include wherein the condition is determined from historical data.

In addition to one or more of the features described herein, or as an alternative, further embodiments may include wherein the wireless sensor comprises a plurality of wireless sensors, the plurality of wireless sensors arranged so that each wireless sensor is associated with a respective zone of the environmental control system.

In another embodiment, a computer program product for controlling an environment control system having a controller and a wireless sensor, the computer program product comprising a computer readable storage medium having program instructions embodied therewith, the program instructions executable by a processor to cause the processor to implement operations including determining that a condition exists to initiate updating a parameter of the wireless sensor; determining an updated parameter in response to the condition; transmitting the updated parameter from the controller to the wireless sensor.

Technical effects of embodiments include the ability to update one or more parameters of a wireless sensor in response to one or more conditions to improve operation of the wireless sensor.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
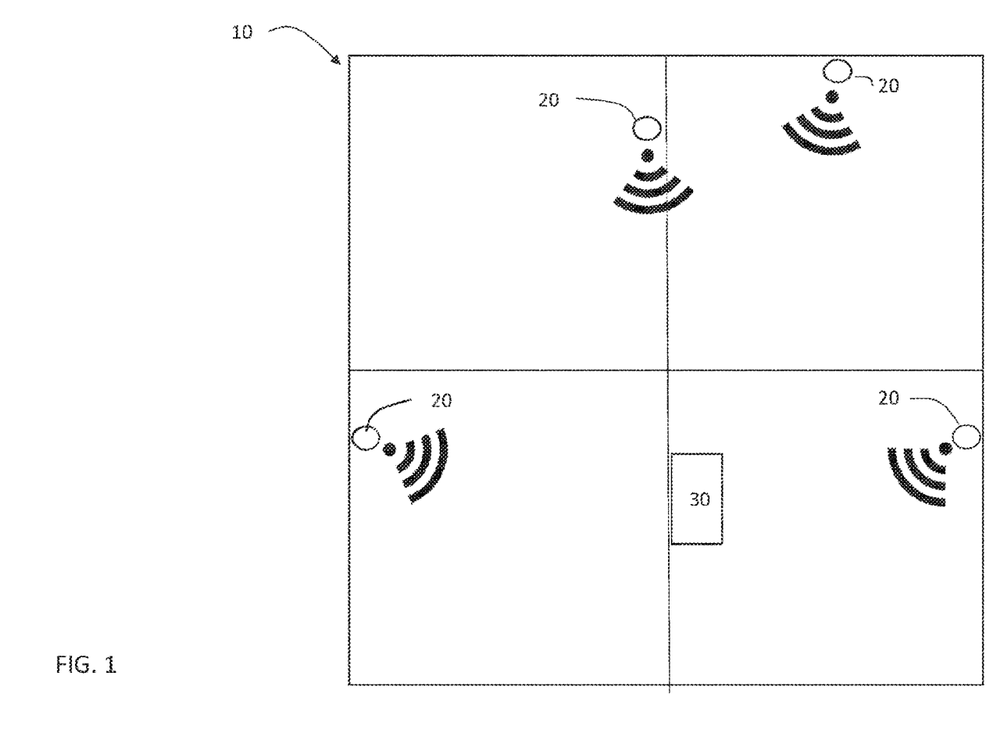
FIG. 1 depicts a building equipped with wireless sensors in an embodiment.

FIG. 1 depicts a building 10 equipped with wireless sensors 20 in an embodiment. The wireless sensors 20 may be part of an environmental control system (e.g., HVAC system). The wireless sensors 20 measure one or more environmental values (e.g., temperature, humidity, occupancy, etc.) and send the sensed environmental values to a controller 30. The wireless sensors 20 may be arranged in a plurality of zones within the building 10, such that each wireless sensor 20 is associated with a respective zone. A controller 30 receives the sensed environmental values from the wireless sensors 20 and controls the environmental control system. For example, the controller 30 can increase or decrease the temperature in a zone based on the sensed temperature in that zone.

Each wireless sensor 20 may be programmed with one or more parameters. One example parameter is a sampling interval. To conserve battery life, each wireless sensor 20 has a low power mode where the sensor does not actively sample the environmental value and does not communicate with controller 30. The sampling interval controls when the wireless sensor is to exit low power mode, sample the environmental value and communicate the sampled environmental value to the controller 30. If the sampling interval is too short, then battery life is used unnecessarily. If the sampling interval is too long, then the controller 30 is not receiving the sampled environmental value frequently enough to adjust the environmental control system to meet user comfort requirements. Other parameters programmed into each wireless sensor may include a bi-directional communication interval, delta temperature threshold, delta humidity threshold, etc. Embodiments described herein adjust one or more parameters of the wireless sensors 20 to both conserve battery life but still provide acceptable control of the environmental control system.

Figure 2:
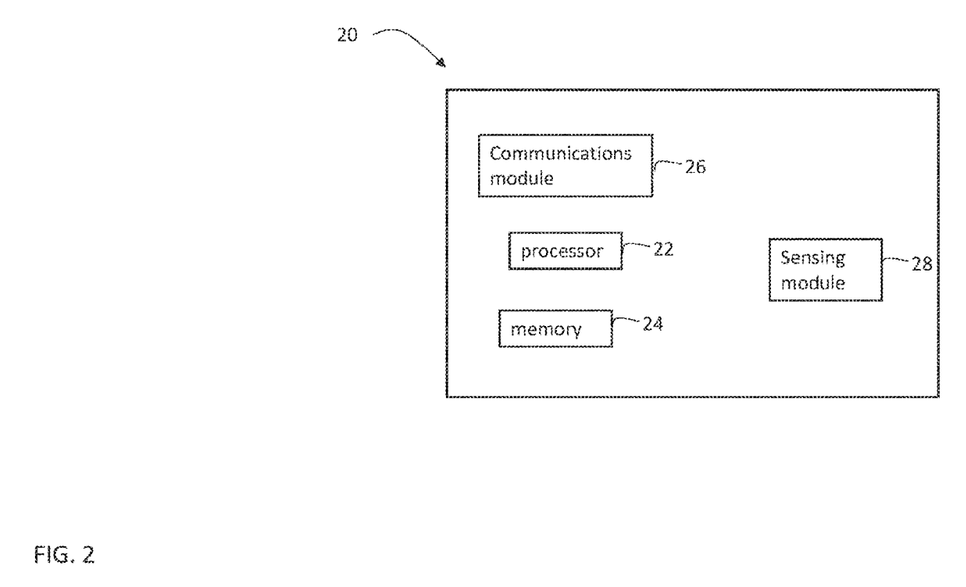
FIG. 2 depicts a wireless sensor in an embodiment.

FIG. 2 depicts a wireless sensor 20 in an embodiment. The wireless sensor 20 may include a processor 22, a memory 24, and communication module 26 as shown in FIG. 2. The processor 22 can be any type or combination of computer processors, such as a microprocessor, microcontroller, digital signal processor, application specific integrated circuit, programmable logic device, and/or field programmable gate array. The memory 24 is an example of a non-transitory computer readable storage medium tangibly embodied in the wireless sensor 20 including executable instructions stored therein, for instance, as firmware. The communication module 26 may implement one or more communication protocols as described in further detail herein. A sensing module 28 senses an environmental value (e.g., temperature, humidity, occupancy, etc.) and generates a signal representative of the environmental value. The processor 22 may store the sensed environmental value in memory 24 and also transmit the sensed environmental value to controller 30.

The wireless sensor 20 and the controller 30 may communicate with one another using a variety of wireless communication techniques, such as 802.11x (Wi-Fi), short-range radio (Bluetooth), or any other known type of wireless communication. According to one or more other embodiments, the wireless sensor 20 may communicate with the controller 30 through a cellular network or over the internet through a number of other devices outside the building 10.

Figure 3:
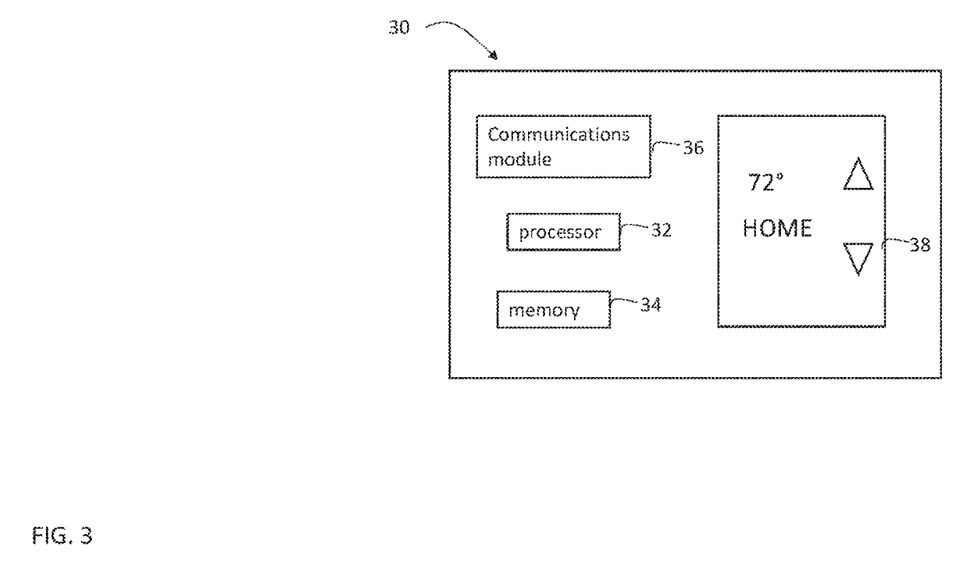
FIG. 3 depicts a controller in an embodiment.

FIG. 3 depicts a controller 30 in an embodiment. The controller 30 may include a processor 32, a memory 34, and communication module 36 as shown in FIG. 3. The processor 32 can be any type or combination of computer processors, such as a microprocessor, microcontroller, digital signal processor, application specific integrated circuit, programmable logic device, and/or field programmable gate array. The memory 34 is an example of a non-transitory computer readable storage medium tangibly embodied in the controller 30 including executable instructions stored therein, for instance, as firmware. The communication module 36 may implement one or more communication protocols (e.g., 802.11x) to communicate with the wireless sensors 20 as described herein. A user interface 38 allows a user to establish one or more setpoints and/or modes for the environmental control system. The setpoints identify desired operating conditions for the environmental control system. For example, a setpoint may be a temperature setting. The user interface also allows the user to define operating modes, such as HOME, AWAY, SLEEP, VACATION, etc. The user can specify times of day and days of week for the operating modes and associate setpoints with each operating mode.

In operation, the controller 30 adjusts one or more parameters (e.g., sampling interval, bi-directional communication interval, delta temperature threshold, delta humidity threshold, etc.) of each wireless sensor 20 in response to one or more conditions. The sampling interval is a periodic time interval for the wireless sensor 20 to sample an environmental value, such as temperature, humidity, occupancy, etc. Increasing the sampling interval will increase the duration of lower power mode and conserve battery life. Decreasing the sampling interval will result in more sampling operations per unit time by the wireless sensor. The bi-directional communication interval is a periodic time interval for the wireless sensor 20 to establish connection and make bi-directional communication with the controller 30.

Figure 4:
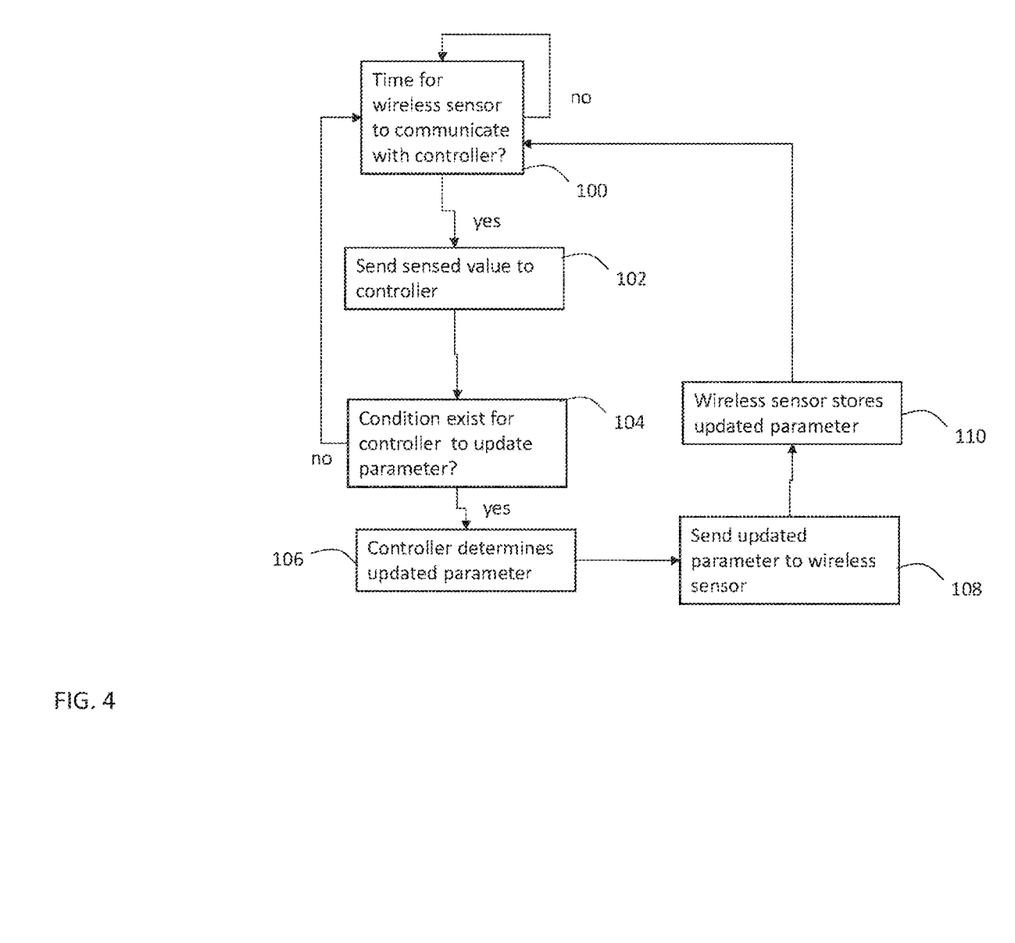
FIG. 4 is a flow chart of a method of adjusting a parameter of a wireless sensor in an embodiment.

FIG. 4 is a flow chart of a method of adjusting the sampling interval of a wireless sensor in an embodiment. The process is described with respect to a single wireless sensor 20, but may be applied to multiple wireless sensors. The process begins at 100 where the wireless sensor 20 determines if the current time corresponds to a time for bi-directional communication with the controller 30. The wireless sensor 20 may periodically communicate with the controller 30 to send sensed value(s) from the wireless sensor 20. If the current time does not correspond to a time for bi-directional communication with the controller 30, the process loops at 100.

If the current time corresponds to a time for bi-communication with the controller 30, flow proceeds to 102 where wireless sensor 20 establishes bi-directional communication with the controller 30. At 102, the controller 30 may receive one or more sensed values from the wireless sensor 20.

At 104, the controller 30 determines if one or more conditions exist that initiate updating one or more parameters of the wireless sensor 20. The condition may have already occurred or the condition may be expected to occur before the next time for bi-directional communication with the wireless sensor 20. The condition may be determined from a variety of sources, such as smart sensors, remote sensors, wireless sensors 20, etc. There are several conditions that can initiate updating one or more parameters of the wireless sensor 20. If at 104, there is no condition that initiates updating the sampling interval of the wireless sensor 20, flow proceeds back to 100.

If at 104, there is a condition that initiates modifying a parameter of the wireless sensor 20, flow proceeds to 106. At 106, the controller determines the updated parameter in response to the condition. An example condition that initiates updating a parameter of the wireless sensor 20 is a change in operating mode of the environmental control system. As noted above, the user interface 38 allows the user to specify operating modes. If at 104, the controller 30 determines that the operating mode has changed or will change before the next time for bi-directional communication with the wireless sensor 20, the controller 30 can update a parameter of the wireless sensor 20 accordingly at 106. For example, if the operating mode has changed from HOME to AWAY since the last bi-directional communication with the wireless sensor 20, the controller 30 may now increase the sampling interval to sample the sensed values less frequently at 106 to conserve the battery. It is understood that more than one parameter of the wireless sensor 20 may be updated in response to the condition.

Another example condition that initiates updating a parameter of the wireless sensor 20 may be a change in one or more setpoints of the environmental control system. As noted above, the user interface 38 allows the user to enter setpoints. If at 104, the controller 30 determines that a setpoint has changed or will change before the next time for bi-directional communication with the wireless sensor 20, the controller 30 can update the sampling interval accordingly at 106. For example, if a setpoint has changed from 72 degrees to 68 degrees, the controller 30 may now decrease the sampling interval at 106. The decreased sampling interval would cause the wireless sensor 20 to sample the sensed value more frequently and thus improve the ability of the environmental control system to meet the new setpoint.

Another example condition that initiates updating a parameter of the wireless sensor 20 may be a change in one or more environmental values, such as temperature or humidity. The environmental value may be compared to a threshold and if the environmental parameter exceeds the threshold, the controller 30 can update the sampling interval accordingly at 106. For example, if a temperature exceeds a lower threshold (e.g., 40 degrees) then the controller 30 may now decrease the sampling interval at 106. The decreased sampling interval would cause the wireless sensor 20 to sample the sensed value (e.g., temperature) more frequently and thus improve the ability of the environmental control system to keep zone temperatures from a potentially harmful temperature (e.g., freezing). In other embodiments, the rate of change of an environmental value may be compared to a threshold and if the rate of change of the environmental value exceeds the threshold, the controller 30 can update the sampling interval accordingly at 106. For example, if the rate of change of the temperature of a zone is increasing faster than a threshold then the controller 30 may decrease the sampling interval at 106.

The condition that initiates the updating of a parameter of the wireless sensor may also be learned from historical data. For example, the controller 30 may detect that during certain times, the environmental control system historically has difficulty meeting the temperature setpoint. For example, the controller 30 may track errors between the setpoint temperature and the sensed temperature and determine periods when the error is largest. Based on this historical data, the controller 30 may decrease the sampling interval during these periods to improve the environmental control system's ability to meet the setpoint temperature.

At 106, the controller 30 determines an updated parameter based on one or more conditions. At 108, the controller 30 transmits the updated parameter to the wireless sensor 20. At 110, the wireless sensor 20 stores the updated parameter and uses the updated parameter going forward. Flow then proceeds to 100 where the controller waits for the next time for bi-directional communication with the wireless sensor 20.

As described above, exemplary embodiments can be in the form of processor-implemented processes and devices for practicing those processes, such as wireless sensor 20 and controller 30. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

Aspects of the present disclosure are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments. In this regard, each block in the flowchart or block diagrams may represent an application, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term "about" is intended to include the degree of error associated with measurement of the particular quantity based upon the equipment available at the time of filing the application and/or manufacturing tolerances.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for controlling an environment control system having a controller and a wireless sensor, the method comprising:
    determining, at the controller, that a condition exists to initiate updating a parameter of the wireless sensor, wherein the condition comprises a change in one or more temperature setpoints of the environmental control system;
    determining, at the controller, an updated parameter in response to the condition;
    transmitting the updated parameter from the controller to the wireless sensor;
    storing, at the wireless sensor, the updated parameter;
    wherein the updated parameter comprises at least one of sampling interval by the wireless sensor and bi-directional communication interval of the wireless sensor.

2. The method of claim 1, wherein:
    the condition exists when (i) the condition has occurred or (ii) is expected to occur before a next time for bi-directional communication between the controller and the wireless sensor.

3. The method of claim 1, wherein:
    the condition comprises a change in operating mode of the environmental control system.

4. The method of claim 1, wherein:
    the condition comprises a change an environmental value.

5. The method of claim 4, wherein:
    the change in the environmental value comprises the environmental value exceeding a threshold.

6. The method of claim 4, wherein:
    the change in the environmental value comprises a rate of change of the environmental value exceeding a threshold.

7. The method of claim 1, wherein:
    the condition is determined from historical data.

8. The method of claim 1, wherein:
    the wireless sensor comprises a plurality of wireless sensors, the plurality of wireless sensors arranged so that each wireless sensor is associated with a respective zone of the environmental control system.

9. The method of claim 1, wherein:
    the updated parameter comprises at least one delta temperature threshold and delta humidity threshold.

10. An environment control system comprising:
    a controller;
    a wireless sensor in communication with the controller;
    the controller determining that a condition exists to initiate updating a parameter of the wireless sensor, wherein the condition comprises a change in one or more temperature setpoints of the environmental control system;
    the controller determining an updated parameter in response to the condition;
    the controller transmitting the updated parameter to the wireless sensor;
    the wireless sensor storing the updated parameter;
    wherein the pupated parameter comprises at least one of sampling interval by the wireless sensor and bi-directional communication interval of the wireless sensor.

11. The environment control system of claim 10, wherein:
    the condition exists when (i) the condition has occurred or (ii) is expected to occur before a next time for bi-directional communication between the controller and the wireless sensor.

12. The environment control system of claim 10, wherein:
    the condition comprises a change in operating mode of the environmental control system.

13. The environment control system of claim 10, wherein:
    the condition comprises a change an environmental value.

14. The environment control system of claim 13, wherein:
    the change in the environmental value comprises the environmental value exceeding a threshold.

15. The environment control system of claim 13, wherein:
    the change in the environmental value comprises a rate of change of the environmental value exceeding a threshold.

16. The environment control system of claim 10, wherein:
    the condition is determined from historical data.

17. The environment control system of claim 10, wherein:
    the wireless sensor comprises a plurality of wireless sensors, the plurality of wireless sensors arranged so that each wireless sensor is associated with a respective zone of the environmental control system.

18. A computer program product for controlling an environment control system having a controller and a wireless sensor, the computer program product comprising a computer readable storage medium having program instructions embodied therewith, the program instructions executable by a processor to cause the processor to implement operations comprising:
    determining that a condition exists to initiate updating a parameter of the wireless sensor, wherein the condition comprises a change in one or more temperature setpoints of the environmental control system;
    determining an updated parameter in response to the condition;

transmitting the updated parameter from the controller to the wireless sensor;
wherein the updated parameter comprises at least one of sampling interval by the wireless sensor and bi-directional communication interval of the wireless sensor.

19. The method of claim 1, wherein the parameter comprises a bi-directional communication interval between the controller and the wireless sensor.

* * * * *